UNITED STATES PATENT OFFICE.

CUMMINGS CHERRY, OF PITTSBURG, PENNSYLVANIA.

IMPROVEMENT IN THE PREPARATION OF DRYING-OIL FROM OILS EXTRACTED FROM BITUMINOUS MINERALS.

Specification forming part of Letters Patent No. 15,644, dated September 2, 1854.

*To all whom it may concern:*

Be it known that I, CUMMINGS CHERRY, of Pittsburg, in the county of Allegheny and State of Pennsylvania, have invented a new and useful composition of matter or manufacture, designed as a substitute for boiled flaxseed-oil in painting and for other purposes where drying-oil is applicable, which I call "Mineral Painting and Varnishing Oil;" and I do hereby declare the following to be a full, clear, and exact description thereof.

To enable others skilled in the art to make my invention, I will proceed to describe the ingredients of which it is made and the process of manufacture.

The basis of my new drying-oil, and that which constitutes its chief ingredient, is oil extracted by distillation from bituminous coal and other bituminous minerals and purified by processes invented by myself, and forming the subject-matter of other applications already made by me for Letters Patent, and which therefore need not be here particularly described.

This bituminous-coal oil, when sufficiently purified, does not possess the requisite drying qualities to fit it for use in painting; but the following process and addition of ingredients gives it this quality in a high degree, and the composition which is the result is found to be a most excellent oil for all purposes where drying-oil is required.

To forty gallons of purified bituminous oil, or, as I call it, "hydrocarbon oil," I add from ten to fifteen pounds of yellow protoxide of lead (litharge) or acetate of lead, if preferred. This mixture I place in an open vessel or boiler, in which I subject it to a low, steady heat until it boils. As soon as ebullition commences I add from time to time small quantities of the common or white rosin of commerce. I then mix in from twelve to fifteen pounds of rosin and keep the mixture all the while slowly boiling, stirring it carefully until the whole of the rosin is entirely dissolved and mixed with the oil and litharge. The heat must not be raised to a higher degree than is absolutely necessary to keep the mixture boiling. When fully mixed the boiling is discontinued and the mixture allowed to cool. It is then ready for use.

Having thus described my new composition or manufacture of drying-oil, I wish to be understood that I do not claim the admixture of litharge or rosin to vegetable or animal oils in the manufacture of drying-oil; but

What I claim as my invention, and desire to secure by Letters Patent, is—

Preparing the oil extracted from bituminous coal with litharge and rosin, in the manner and for the purposes as specified.

In testimony whereof I have hereunto set my hand this 5th day of November, A. D. 1855.

CUMMINGS CHERRY.

Witnesses:
WM. N. HOWARD,
JOHN MCARTHUR.